J. A. COX.
TIRE CHAIN LOCK.
APPLICATION FILED NOV. 12, 1917.
1,280,409. Patented Oct. 1, 1918.
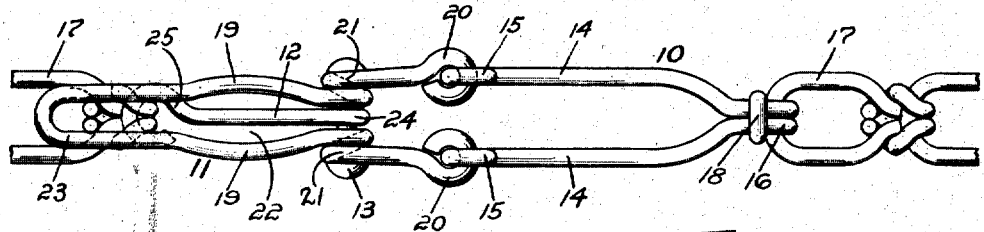
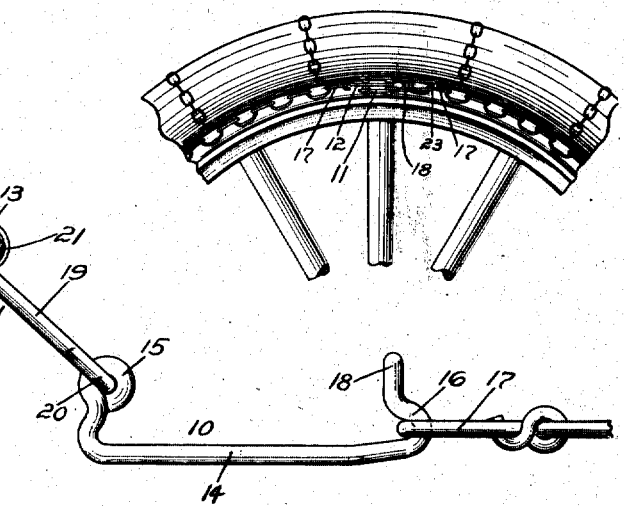
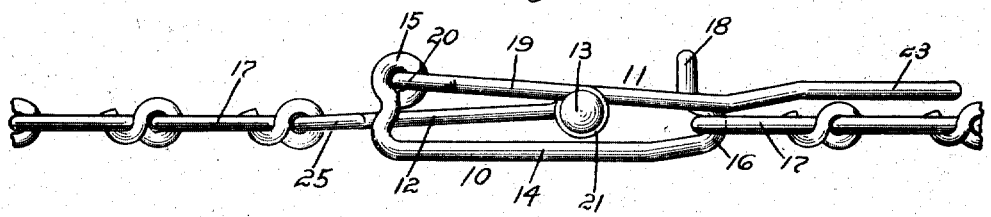
INVENTOR
John Adolphus Cox
BY
A. M. Wooster
ATTORNEY

UNITED STATES PATENT OFFICE.

JOHN ADOLPHUS COX, OF BRIDGEPORT, CONNECTICUT.

TIRE-CHAIN LOCK.

1,280,409.  Specification of Letters Patent.  Patented Oct. 1, 1918.

Application filed November 12, 1917. Serial No. 201,677.

*To all whom it may concern:*

Be it known that I, JOHN ADOLPHUS COX, a citizen of the United States, residing at Bridgeport, county of Fairfield, State of Connecticut, have invented an Improvement in Tire-Chain Locks, of which the following is a specification.

This invention relates to tire chains, so called, and has for its object to provide a simple and inexpensive locking and tension adjusting device adapted for use in connection with any non-skid device having side chains, which shall be easy to operate in attaching, removing or adjusting a tire chain, and which shall be self-locking, that is self-retaining in the locking position.

With these and other objects in view, I have devised the novel tire chain lock which I will now describe, referring to the accompanying drawing forming a part of this specification, and using reference characters to indicate the several parts.

Figure 1 is a plan view showing my novel lock connected to the ends of a side chain, but remaining in the open or unlocked position;

Fig. 2 a side elevation corresponding therewith;

Fig. 3 a similar view showing the parts in the locked position, and

Fig. 4 is a partial side elevation of an automobile wheel illustrating the use of my novel lock in securing a tire chain thereon.

The important features of the invention are that it is so constructed as to permit the parts to be formed from wire, and that the parts are doubly locked in the locking position. My novel chain lock consists simply of a body 10, a clamping lever 11, a connecting member 12, and a stud 13. The body is formed from a single piece of wire bent to shape and comprises two spaced apart arms 14, having eyes 15 at their ends bent at a right angle to the arms. The other ends of the arms are bent together and then upward and over to form a hook 16 adapted to engage a chain end 17, the end of the hook being bent outward substantially parallel with the eyes. This end of the hook is formed from the midlength of the piece of wire, the sides of the loop being separated to form a widened head 18 which coöperates with the clamping lever, as will presently be explained. The clamping lever likewise is formed from a single piece of wire bent to shape and comprises two spaced apart arms 19 having at their ends eyes 20 which loosely engage eyes 15 on the body. At a suitable distance from eyes 20 are eyes 21, formed by coiling the wire, through which the stud passes, the ends of the stud being headed as shown. The connecting member is pivoted on this stud. Contiguous to eyes 21, the arms diverge slightly and then converge to form a spring socket 22 which is adapted to coöperate with head 18. The portion of the clamping lever formed from the midlength of the piece of wire comprises a hand piece 23 for convenience in manipulating the lever. The connecting member, likewise formed from a piece of wire, has an eye 24 which is pivoted on the stud, and at its other end a hook 25 which is adapted to engage the other chain end 17.

It is of course well understood that the tire chains in general use consist essentially of side chains, one lying on each side of the tire, and cross chains extending between the side chains. In practice it is only necessary to use one of my novel locks upon each tire chain, the ends of the inner side chain being connected in any preferred manner. The outer side chain is shortened by the removal of three, more or less links, the chain lock taking their place, the ends of the outer side chain being indicated by 17. Hook 25 may be permanently or detachably connected to one end of the side chain as preferred. In attaching a tire chain to a wheel the chain is placed over the tire in the usual manner. The parts of the lock being in the position shown in Figs. 1 and 2, hook 16 is connected to the free end of the chain and then the clamping lever is swung from the position shown in Figs. 1 and 2 to that shown in Figs. 3 and 4. As the clamping lever is swung to place, the connecting member will swing inward between the connecting eyes of the clamping lever and the body, and head 18 upon the body will spring into socket 22 on the clamping lever. It will be noted that in this position the clamping lever has passed its center of oscillation, so that pull upon the chain ends will lock it there. The clamping lever is additionally locked against movement by the engagement of head 18 with spring socket 22.

Having thus described my invention, I claim:—

1. A tire chain lock comprising a body having at one end a hook, adapted to engage a chain end, and a head, a connecting member having at one end a hook adapted to engage another chain end, and a clamping lever pivotally connected to the body and pivotally connected to the connecting member at a distance from the connection to the body, said clamping lever being adapted to swing past its center of oscillation in the locking movement and having a spring socket adapted to engage the head to lock the parts in place.

2. A tire chain lock comprising a body formed from a piece of wire and having at one end a hook and a head, and at the other end eyes, a connecting member having at one end a hook, and a clamping lever formed from a piece of wire, and having at one end eyes engaging the eyes on the body, other eyes at a distance therefrom, a stud in the last mentioned eyes on which the connecting member is pivoted, and having a spring socket adapted to receive the head, whereby the parts are locked in place.

3. A tire chain lock comprising a body formed from a piece of wire and having arms with eyes at one end, and a hook and a head at the other end formed from the midlength of the piece, a connecting member having at one end a hook, and a clamping lever comprising arms having at one end eyes engaging the eyes on the body and at a distance from said eyes other eyes, and a stud in the last mentioned eyes on which the connecting member is pivoted, said arms also being bent to form a spring socket adapted to receive the head, for the purpose set forth, and the midlength of the piece of wire forming a hand piece for the lever.

4. A tire chain lock comprising a body having at one end a hook, adapted to engage a chain end, a connecting member having at one end a hook adapted to engage another chain end, and a clamping lever pivotally connected to the body and pivotally connected to the connecting member at a distance from the connection to the body, said clamping lever being adapted to swing past its center of oscillation in the locking movement and said lever and body being provided with additional coöperating means for retaining the parts in the locked position.

5. A tire chain lock formed from wire and comprising a body having arms, and at one end a hook and a head, a clamping lever having arms with a hinge connection to the arms of the body and a spring socket adapted to coöperate with the head, and a connecting member pivotally connected to the clamping lever at a distance from the connection to the body, said member having a hook at one end and being adapted to swing between the arms of the clamping lever and of the body.

In testimony whereof I affix my signature.

JOHN ADOLPHUS COX.

Copies of this patent may be obtained for five cents each, by addressing the "Commissioner of Patents, Washington, D. C."